March 23, 1965        L. F. BIRD        3,175,166

DIRECT-CURRENT SWITCH EMPLOYING PNPN CONTROLLED RECTIFIERS

Filed Dec. 27, 1961

INVENTOR
L. F. BIRD
BY
ATTORNEY

3,175,166
DIRECT-CURRENT SWITCH EMPLOYING PNPN CONTROLLED RECTIFIERS

Lester F. Bird, Madison, N.J., assignor to Bell Telephone Laboratories, Incorporated, New York, N.Y., a corporation of New York
Filed Dec. 27, 1961, Ser. No. 162,599
1 Claim. (Cl. 331—111)

This invention relates to direct-current switches and more particularly to direct-current switches employing thyratron-like semiconductor elements.

In any direct-current switch it is necessary that there be a way to control the on and off time of the current applied to a load through the switch. It is also desirable that the power required to control this load current be minimal compared to the load current.

It is therefore desirable to employ a thyratron-like semiconductor element, for example, a PNPN controlled rectifier, which has a very advantageous control current requirement. However, it is well known that as in the case of the gaseous thyratron, once a PNPN controlled rectifier fires, the gate electrode thereof loses all control and it becomes necessary to either open the circuit, shunt the current around the rectifier, or to back-bias the element.

It is therefore an object of this invention to employ a PNPN controlled rectifying element as a direct-current switch.

It is an additional object to provide a shut-off circuit for a PNPN element in a direct-current switch that places the absolute control of the load current on the control electrode of the element.

In accordance with the invention, therefore, a direct-current switch comprises a PNPN controlled rectifying element connected between a direct-current source and a direct-current load. A series resonant circuit of an inductor and a capacitor is connected between the anode and the cathode of the PNPN element to effectively place the control of load current on the control electrode of the element. A means for selectively applying a starting current to the element is connected between the control electrode and anode thereof.

These and other features of the invention will appear more clearly and fully upon consideration of the following specification taken in connection with the drawing in which.

Figure 1:
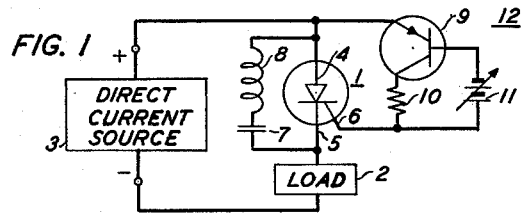
FIG. 1 is a schematic diagram of a direct-current switch employing a PNPN controlled rectifier in accordance with the invention.

A basic direct-current switch according to the invention is shown in FIG. 1 and includes a PNPN controlled rectifier element 1 connected in series between a load 2 and a direct-current source 3. The conduction of current through load 2 is therefore controlled by the conduction state of the PNPN element 1.

The rectifying element 1 is a 3-terminal device and has an anode 4, a cathode 5 and a control electrode 6. Across the element 1, from its anode 4 to its cathode 5, is connected a series combination of a capacitor 7 and an inductor 8, the function of which will be hereafter discussed. Between the control electrode 6 and the anode 4 of element 1 is connected a gate control circuit 12 comprising an active element 9, such as a transistor, which acts as a variable resistance in series with a resistor 10, and a bias source 11, which controls the current through the active element 9 and therefore the resistance of the control circuit.

When the direct-current voltage from source 3 is initially applied to the circuit and there is no starting current applied to control electrode 6, the rectifying element 1 will not conduct (assuming the voltage applied is, of course, less than the break-over voltage of the element). Therefore, this direct-current voltage from source 3 will appear across capacitor 7 which will thereafter charge through load 2 and inductor 8.

Figure 2:
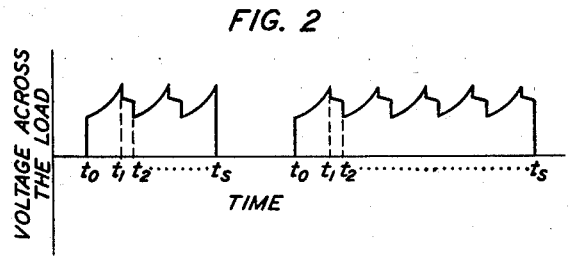
FIG. 2 is a waveform of the load voltage appearing across the load of FIG. 1.

If the value of the voltage from source 11 is now increased so that active element 9 may conduct, the increased current flow through resistor 10 to the control electrode 6 may be sufficient to cause conduction through the rectifying element 1. The voltage across the load at this time is graphically represented in FIG. 2 as that which exists at time $t_0$. Before the element begins conducting and after capacitor 7 has reached its charged state, it is seen that the voltage across the load was zero.

With the rectifying element 1 beginning conduction at time $t_0$ the capacitor 7 will now resonantly discharge through inductor 8 and this conducting rectifiying element 1. The voltage across the load thereafter increases until time $t_1$ when it reaches its most positive value and the voltage across the rectifying element 1 is at its least positive value. When the rectifying element 1 has its least positive value of voltage, the starting current applied to control electrode 6 may be removed to cause the current conduction through the load 2 to cease.

However, if the starting current is not removed at this time, the voltage across the rectifying element 1 will again build up by the charging of capacitor 7 to the point at which the controlled rectifier will again fire. As long as the starting current is applied to the rectifying element 1, load current will flow and the voltage appearing across the load 2 will have the waveform shown in FIG. 2. It is noted in the waveform of FIG. 2 that there is a ripple present on the direct-current voltage across the load. The frequently of this ripple is determined by the resonant frequency of the series combination of capacitor 7 and inductor 8, for one part, and the charge time of the capacitor 7 through inductor 8 and load 2, for the other part.

As stated above, the load current can be stopped by removing the starting current from the control electrode of the rectifying element 1 at the time when the voltage across the element is at its least positive value. However, if the starting current is removed at a different time, the element will continue to conduct until the next time that the voltage across the element reaches its least positive value through the action of capacitor 7 and inductor 8.

Therefore, if the frequency of operation of the series resonant circuit of capacitor 7 and inductor 8 is increased, the time between succeeding occurrences of least positive potential across the element will be reduced, thereby providing a greater precision of control by the gate electrode.

A typical operation of the switch that is in no way limiting, but only illustrative, is where the frequency of the series combination is 30,000 cycles-per-second and the repetition rate of the application and removal of the starting current is 1000 cycles-per-second. For this frequency and repetition rate it is apparent that the control electrode will have very precise control of the load current.

The ripple appearing on the load voltage waveform may be greatly reduced by the insertion of an inductor in series with the load 2. However, for many applications of the direct-current switch, this ripple is not critical and an inductor is not necessary.

There are many possible and advantageous applications for the direct-current switch of FIG. 1, wherein load 2 may be one of many types. It may, for example, be used in an automobile ignition system where load 2 represents the coil, whereby the voltage is coupled to the spark plugs, and the control circuit 12 represents the ignition timing circuit.

Figure 3:
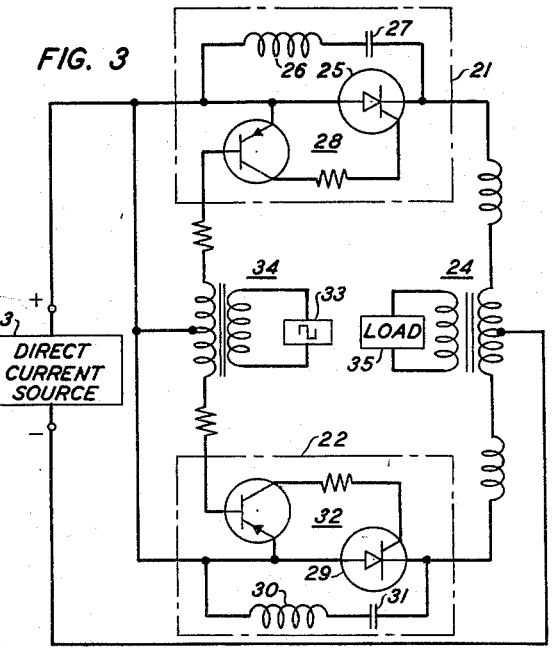
FIG. 3 is a schematic diagram of an inverter amplifier employing the direct-current switch of FIG. 1.

Another particularly advantageous use for the direct-current switch of FIG. 1 is shown in FIG. 3 wherein it is employed in an inverter amplifier.

A first direct-current switch 21 and a second direct-current switch 22, both similar to the switch of FIG. 1, are connected in parallel between a direct-current source 23 and a transformer 24. Switch 21 comprises a PNPN element 25, a series combination of an inductor 26 and a capacitor 27 connected between the anode and cathode of the switch and a gate control circuit 28 connected between the gate electrode and the anode of the switch. Switch 22 similarly comprises a PNPN element 29, a series combination of an inductor 30 and a capacitor 31 and a gate control circuit 32.

A low power square wave from a source 33 is applied through a transformer 34 to the gate control circuits 28 and 32, thereby effectively replacing source 11 of FIG. 1 with an automatic control of the control circuit bias. As the square wave from source 33 is applied through transformer 34 to the gate control circuits 28 and 32 of switches 21 and 22, respectively, the switches will conduct alternately thereby producing a square wave across transformer 24. This square wave may be coupled into a load 35 connected across the secondary of transformer 24. The square wave appearing across load 35 may now be of much greater power than that applied to the gate control circuits of switches 21 and 22, thereby effectively permitting amplification of the initial square wave of source 33.

What is claimed is:

In combination, a thyratron-like switching device having a control electrode and a transconductive path terminated by an anode and a cathode, a two-terminal source of a direct-current potential, a load, circuit means for connecting said transconductive path and said load in series between the terminals of said source, the series combination of a capacitor and an inductor connected in parallel with said transconductive path such that when said transconductive path is nonconductive said capacitor is charged by said source through a circuit including the series combination of said inductor and said load, a transistor having a base electrode and a collector-emitter path, circuit means for connecting said collector-emitter path between the anode and control electrode of said switching device, a source of an electrical control signal, and circuit means for applying said electrical control signal to said base electrode of said transistor to reduce the impedance of said collector-emitter path whereby the current flow through said collector-emitter path renders said transconductive path conductive each time said capacitor is charged to a predetermined potential.

References Cited by the Examiner
UNITED STATES PATENTS

| | | | |
|---|---|---|---|
| 2,391,894 | 1/46 | Gorham et al. | 331—128 |
| 3,015,739 | 1/62 | Mantenffel | 307—88.5 |
| 3,047,789 | 7/62 | Lowry | 307—88.5 |
| 3,089,965 | 5/63 | Krezek | 307—88.5 |

ARTHUR GAUSS, *Primary Examiner.*